United States Patent
Matarazzi et al.

(10) Patent No.: US 9,933,165 B2
(45) Date of Patent: Apr. 3, 2018

(54) OVEN COMPRISING A CAMERA

(71) Applicant: Indesit Company S.p.A., Fabriano (IT)

(72) Inventors: Filippo Matarazzi, Gualdo Tadino (IT); Carlo Filippo Ratti, Turin (IT); Marco Maria Pedrazzo, Cuneo (IT)

(73) Assignee: Whirlpool EMEA S.p.A., Pero (IT)

( * ) Notice: Subject to any disclaimer, the term of this patent is extended or adjusted under 35 U.S.C. 154(b) by 296 days.

(21) Appl. No.: 14/677,147

(22) Filed: Apr. 2, 2015

(65) Prior Publication Data

US 2015/0285512 A1 Oct. 8, 2015

(30) Foreign Application Priority Data

Apr. 7, 2014 (IT) .............................. TO2014A0288

(51) Int. Cl.
| | |
|---|---|
| F24C 15/00 | (2006.01) |
| F24C 7/08 | (2006.01) |
| F27D 21/02 | (2006.01) |
| H04N 1/00 | (2006.01) |

(52) U.S. Cl.
CPC .............. *F24C 15/00* (2013.01); *F24C 7/08* (2013.01); *F24C 15/008* (2013.01); *F27D 21/02* (2013.01); *H04N 1/0005* (2013.01); *H04N 1/00045* (2013.01); *H04N 1/00079* (2013.01)

(58) Field of Classification Search
USPC .......................................................... 99/341
See application file for complete search history.

(56) References Cited

U.S. PATENT DOCUMENTS

| | | | | | |
|---|---|---|---|---|---|
| 6,559,882 | B1 * | 5/2003 | Kerchner | ............. | H05B 6/6435 219/506 |
| 8,085,543 | B2 * | 12/2011 | McCoy | ................. | G06F 1/1601 361/729 |
| 8,528,610 | B2 * | 9/2013 | Kuehl | ..................... | F16L 37/26 141/349 |
| 8,563,059 | B2 * | 10/2013 | Luckhardt | ................. | F24C 7/08 426/233 |
| 8,756,942 | B2 * | 6/2014 | Min | ........................ | F25D 29/00 62/125 |
| 2006/0164324 | A1 * | 7/2006 | Polivy | ................... | G06F 3/1438 345/1.1 |

(Continued)

FOREIGN PATENT DOCUMENTS

| | | |
|---|---|---|
| EP | 1 028 604 A2 | 8/2000 |
| EP | 2 515 044 A1 | 10/2012 |

(Continued)

OTHER PUBLICATIONS

Italian Search Report and Written Opinion dated Sep. 4, 2014 for Italian Patent Application No. TO2014A000288 filed on Apr. 7, 2014 by Indesit Company S.p.A., 6 pages.

*Primary Examiner* — Anne M Antonucci
*Assistant Examiner* — Renee LaRose
(74) *Attorney, Agent, or Firm* — Cesari and McKenna, LLP

(57) ABSTRACT

Oven comprising: a muffle; operating means for heating an active zone defined within the volume delimited by said muffle; a camera for detecting one or more images showing food positioned in said active zone; a transmission unit associated with said camera and configured for sending said one or more images to an auxiliary device configured for at least displaying said one or more images.

9 Claims, 4 Drawing Sheets

(56) References Cited

U.S. PATENT DOCUMENTS

2008/0185378 A1* 8/2008 Beausse ............... H05B 6/6423
219/757

FOREIGN PATENT DOCUMENTS

| EP | 2 520 169 A1 | 11/2012 |
| EP | 2 530 387 A1 | 12/2012 |
| JP | H11 54265 A | 2/1999 |

* cited by examiner

OVEN COMPRISING A CAMERA

CROSS REFERENCE TO RELATED APPLICATIONS

This application claims priority to Italian Application No. TO2014A000288, filed on Apr. 7, 2014, the contents of which are hereby incorporated by reference in its entirety.

TECHNICAL FIELD

The present invention relates to an oven provided with a camera.

PRIOR ART

As is known, preparing food by means of an oven poses a number of problems: since food is cooked in a closed environment, it is always difficult to tell when cooking is complete. In fact, although ovens are usually provided with a door that is at least partially transparent, and with lighting means mounted inside the oven itself, evaluating the actual degree of cooking is still a complex operation.

Moreover, when the user tries to overcome this problem by opening the door to directly observe the food, he/she will risk to interrupt the cooking cycle in an uncontrolled manner, thus making the continuation of the same more difficult and less deterministic, while also risking burns and scalds caused by the high temperature that can be reached inside the oven in operation.

OBJECTS AND SUMMARY OF THE INVENTION

The present invention aims at providing an oven which can solve the above-mentioned problems.

In particular, it is one object of the invention to provide an oven which allows a more reliable evaluation of the degree of cooking of food being prepared, without requiring that the oven door be opened.

This and other objects are substantially achieved by an oven in accordance with the appended claims.

A basic idea of the present invention is to provide the oven with a camera configured for detecting one or more images representative of the food contained in the oven itself, and for making such one or more images available to the user.

The user can then verify the food cooking conditions, and possibly intervene in order to modify/stop the cooking of the food.

In this way, food preparation can be optimized without having to gain direct access to the inside of the oven, thereby avoiding the above-mentioned problems.

Therefore, the invention concerns an oven comprising:
a muffle;
operating means for heating an active zone defined within the volume delimited by said muffle;
a camera for detecting one or more images showing food positioned in said active zone;
a transmission unit associated with said camera and configured for sending said one or more images to an auxiliary device configured for at least displaying said one or more images.

Preferably, said auxiliary device is associated with a memory storing one or more reference images, preferably of the colorimetric type.

Preferably, said auxiliary device is configured for displaying a comparison between said one or more images transmitted by said transmission unit and one or more of said reference images.

Preferably, said auxiliary device comprises or is integrated into a television set or a digital monitor.

Preferably, said auxiliary device is a Personal Digital Assistant, such as, for example, a palmtop, a smartphone, a tablet, etc.

Preferably, said oven is provided with a door associated with said muffle, which can be opened/closed to selectively allow access to said active zone.

Preferably, said camera is integrated into said door.

Preferably, said door comprises four layers of athermic material substantially transparent to visible light.

Preferably, said camera is housed in a recess formed in one of said layers.

Preferably, said camera is housed in a recess formed in the third layer, counting from said active zone, of said four layers.

Preferably, said camera is mounted on a wall belonging to said muffle.

Preferably, said camera is provided with a thermal protection element, which is thermally insulating and at least partially transparent to the radiations detected by said camera.

Further features and advantages will become more apparent from the following detailed description of a preferred but non-limiting embodiment of the invention.

BRIEF DESCRIPTION OF THE DRAWINGS

Said description will refer to the annexed drawings, also provided merely as explanatory and non-limiting examples, wherein.

The drawings show different aspects and embodiments of the present invention and, where appropriate, similar structures, components, materials and/or elements are designated in the various drawings by the same reference numerals.

DETAILED DESCRIPTION OF THE INVENTION

Figure 1:
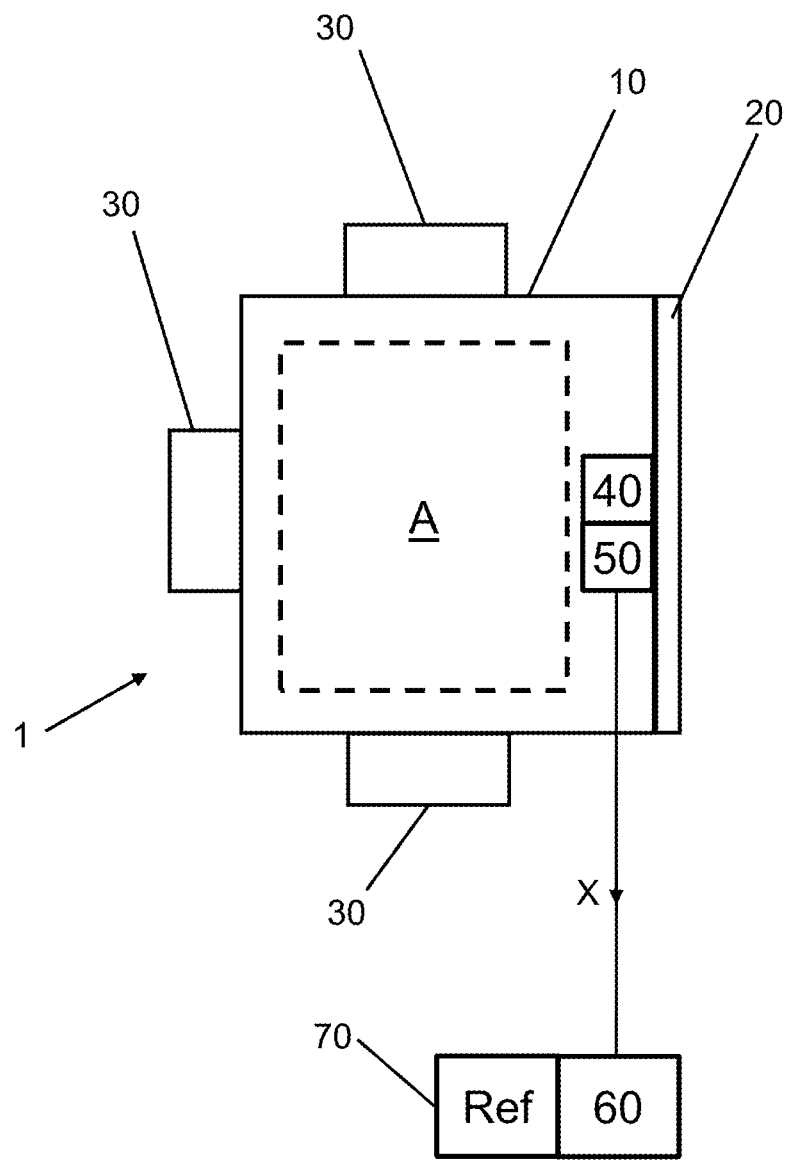
FIG. 1 is a block diagram of a schematic top view representative of an oven according to the invention.

With reference to the annexed drawings, reference numeral 1 designates as a whole an oven in accordance with the present invention.

The oven 1 (FIG. 1) comprises, in the first place, a muffle 10. The muffle 10 has a box-like shape, preferably a parallelepiped shape, and has an opening for inserting/removing food to be warmed up or cooked.

Preferably, the muffle 10 is associated with a door 20, which can be opened/closed to selectively allow access to the inside of the oven 1.

The oven 1 is also provided with operating means 30 for heating an active zone A defined within the internal volume of said muffle 10.

The door 20 allows, therefore, selective access to the active zone A as a function of its own operating position.

The operating means 30 may comprise, by way of example, one or more electric resistors and one or more ventilation ducts. These features, which are per se known, will not be described any further.

In accordance with the invention, the oven 1 comprises a camera 40.

The camera 40 is configured for detecting one or more images X showing food positioned in the active zone A.

Advantageously, the camera 40 is configured for detecting a plurality of images, so as to reproduce the evolution of the food during the warming/cooking process.

Figure 2:
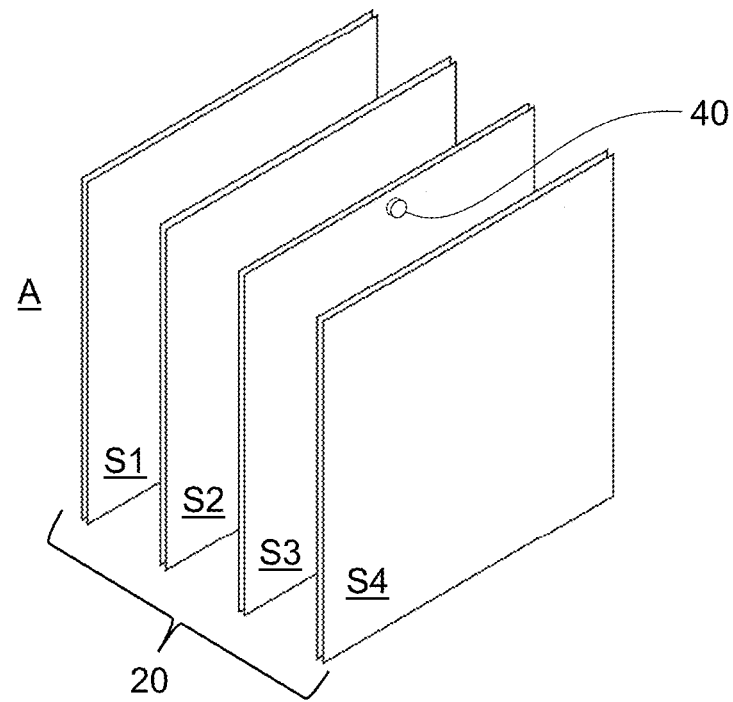
FIG. 2 is a partially exploded view of a detail of an embodiment of the oven of FIG. 1.

In one embodiment (FIG. 2), the camera 40 is integrated into the door 20.

In particular, the door 20 may comprise four layers S1-S4 of athermic material substantially transparent to visible light.

The camera 40 can thus be housed in a recess 40a formed in one of said layers S1-S4.

In the preferred embodiment, the camera 40 is housed in a recess formed in the third layer S3 (counting from the inside of the oven 1, i.e. from the active zone A).

In this manner, the camera 40 will be sufficiently insulated, from a thermal viewpoint, from the inside of the oven 1, while at the same time being protected against any interference/tampering by careless or ill-intentioned users.

Preferably, the camera 40 is substantially as thick as the layer in which it is housed.

Figure 3:
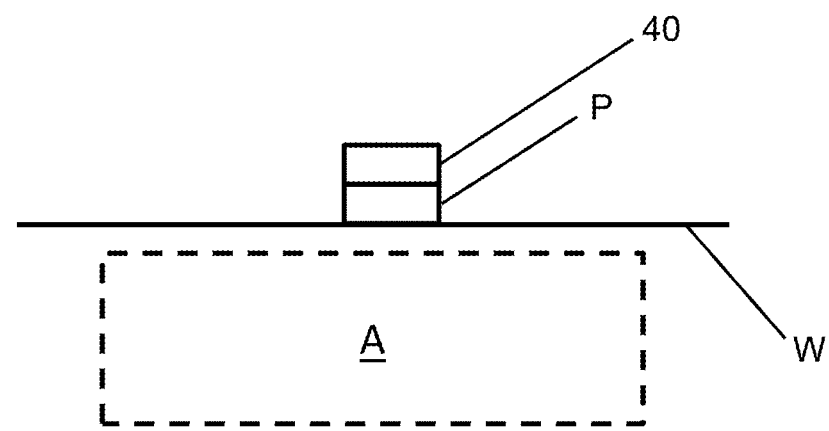
FIG. 3 shows a detail of an embodiment of the oven of FIG. 1.

In one embodiment (FIG. 3), the camera 40 is mounted on a wall W belonging to the muffle 10.

Preferably, the camera 40 is provided with a thermal protection element P, which is thermally insulating and at least partially transparent to the radiations detected by said camera 40.

Advantageously, the camera 40 is associated with a transmission unit 50, which is configured for transmitting said one or more images detected by the camera 40 itself.

The transmission unit 50 preferably uses a wireless technology; in particular, it performs a radio-frequency transmission (RF). By way of example, the transmission may rely on a wi-fi network, a Bluetooth® connection, or a global network such as GSM/UMTS/LTE/LTE-A.

The transmission unit 50 is configured for sending said one or more images X to an auxiliary device 60 configured for at least displaying said one or more images.

Figure 4:
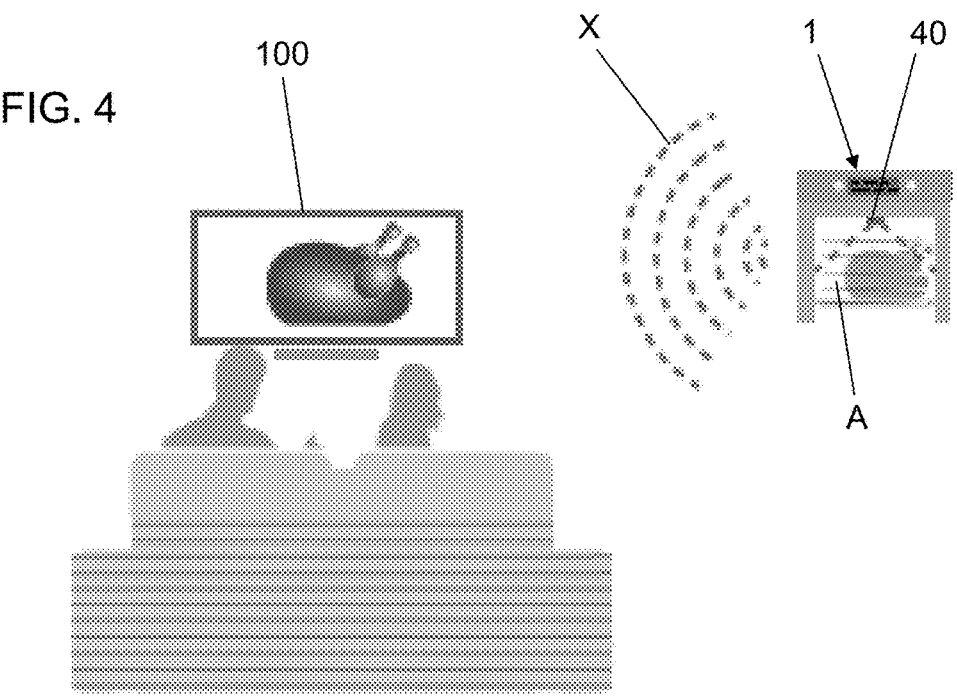
FIG. 4 schematically shows one possible application of the oven of FIG. 1.

In one embodiment (FIG. 4), the auxiliary device 60 comprises or is integrated into a television set or a digital monitor 100.

Figure 5:
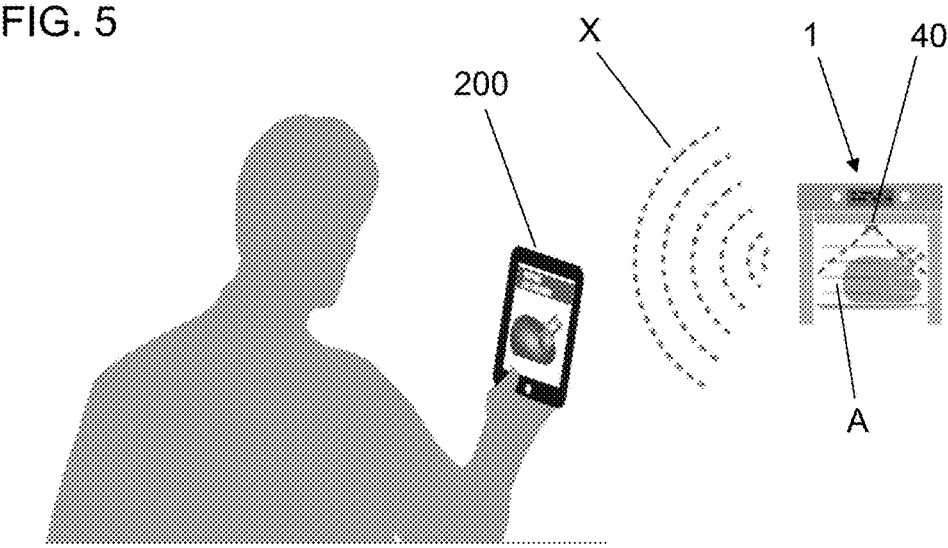
FIG. 5 schematically shows one possible application of the oven of FIG. 1.

In one embodiment (FIG. 5), the auxiliary device 60 is a Personal Digital Assistant 200, such as, for example, a palmtop, a smartphone, a tablet, etc.

The user can thus verify, in the course of time, the degree of cooking of the food without having to gain access to the inside of the oven 1, and without necessarily having to be in proximity to the latter.

Advantageously, the auxiliary device 60 is associated with a memory 70 storing one or more reference images Ref, preferably of the colorimetric type.

Figure 6:
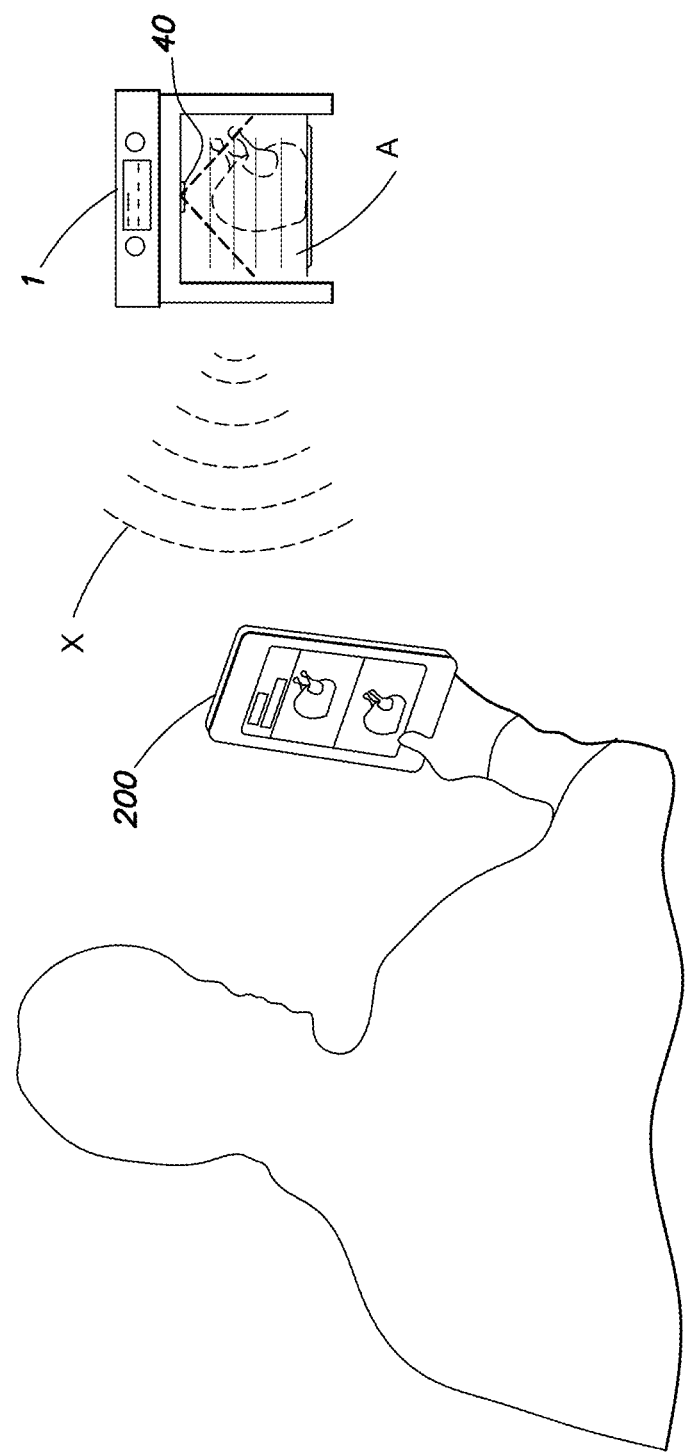
FIG. 6 schematically shows one possible application of the oven of FIG. 1.

Advantageously and in one embodiment (FIG. 6), the auxiliary device 60 is configured for displaying a comparison between said one or more images X transmitted by said transmission unit 50 and one or more of said reference images Ref.

This option is particularly advantageous when recipes are preset in or downloaded to the auxiliary device 60.

In this manner, the user is given an objective reference for evaluating the cooking condition of the food being prepared.

The invention offers significant advantages.

The oven according to the invention allows, in fact, a more reliable evaluation of the cooking condition of the food being prepared, without requiring the oven door to be opened.

In addition, the invention allows the user to evaluate the conditions of the food positioned inside the oven, without even needing to be in proximity to the latter.

The invention claimed is:

1. An oven comprising:
    a) a muffle including an active zone defined within a volume by said muffle, wherein the active zone at least heats food positioned in the active zone;
    b) a camera that detects one or more images showing said food positioned and being cooked in said active zone;
    c) a transmission unit associated with said camera that sends said one or more images to an auxiliary device that displays a comparison between said one or more images transmitted by said transmission unit and one or more reference images stored in a memory associated with the auxiliary device, wherein displaying the comparison includes displaying the one or more images with the one or more references images.

2. The oven according to claim 1, further comprising a door associated with said muffle, said door transitioning from being opened and closed to selectively allow access to said active zone, wherein said camera is integrated into said door.

3. The oven according to claim 2, wherein said door includes four layers of an athermic material substantially transparent to visible light, wherein said camera is housed in a recess formed in one of said layers.

4. The oven according to claim 3, wherein said camera is housed in a recess formed in a third layer of said four layers, and said third layer is determined by counting outwardly from said active zone inside said oven.

5. The oven according to claim 1, wherein said camera is mounted on a wall of said muffle.

6. The oven according to claim 5, wherein said camera is provided with a thermal protection element that is thermally insulating and at least partially transparent to radiations detected by said camera.

7. A system, comprising:
    a) an oven for cooking or warming up food;
    b) an auxiliary device that receives from the oven, one or more images showing said food in said oven, and further displays the one or more images received from said oven and one or more reference images stored in a memory associated with the auxiliary device, wherein the one or more reference images include at least one image of a colorimetric type.

8. The system according to claim 7, wherein said auxiliary device is a television set or a digital monitor or said auxiliary device is integrated into the television set or the digital monitor.

9. The system according to claim 7, wherein said auxiliary device is one of a Personal Digital Assistant, a smartphone, and a tablet.

* * * * *